3,210,703
TRANSFORMERS HAVING INTERLEAVED
WINDINGS
Arthur M. Lockie, Hickory Township, Mercer County,
Pa., assignor to Westinghouse Electric Corporation,
East Pittsburgh, Pa., a corporation of Pennsylvania
Filed Apr. 13, 1962, Ser. No. 187,255
4 Claims. (Cl. 336—183)

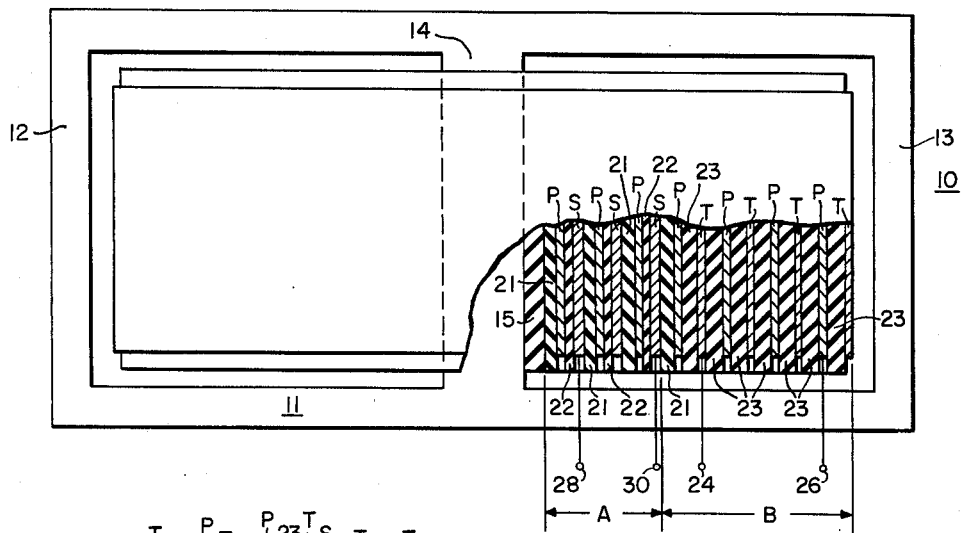
Fig.1.
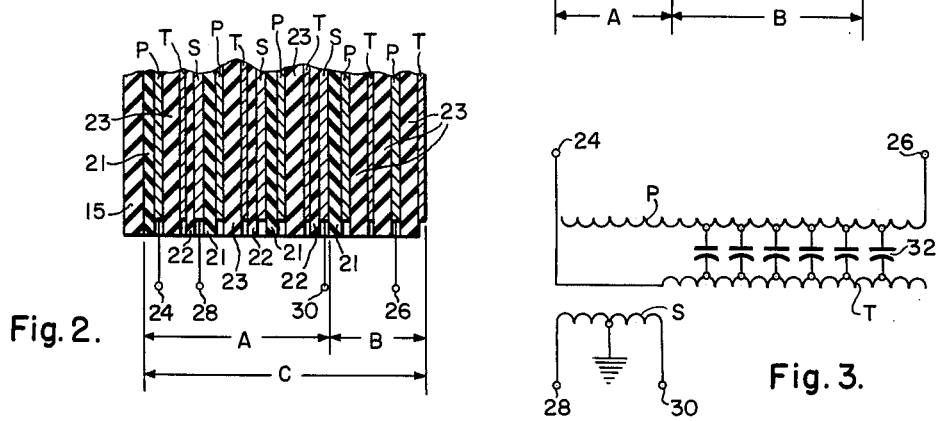
Fig.2.
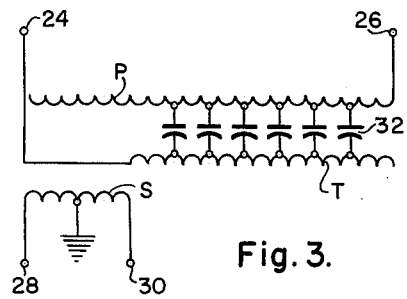
Fig.3.
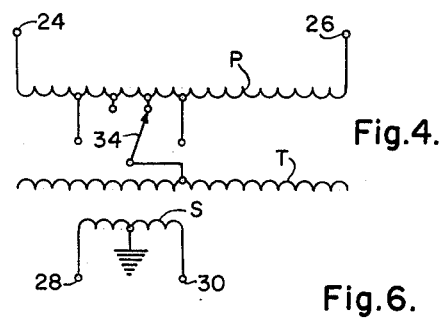
Fig.4.
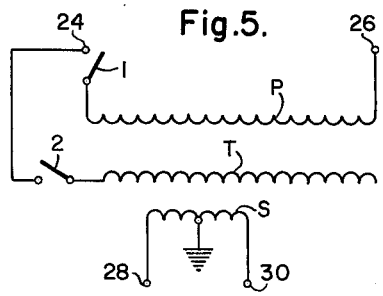
Fig.5.
Fig.6.
| CAPACITANCE | OPEN | CLOSE |
|---|---|---|
| SERIES | 1 | 2 |
| SHUNT |  | 1 & 2 |
| NO | 2 | 1 |
INVENTOR
Arthur M. Lockie
BY
F. E. Browder
ATTORNEY

United States Patent Office 3,210,703
Patented Oct. 5, 1965

This invention relates, generally, to electrical inductive apparatus and, more particularly, to the windings for inductive apparatus, such as transformers.

In providing the windings for transformers having capacitive characteristics, such as described in copending applications, Serial No. 745,555, filed June 30, 1958 by A. M. Lockie, now abandoned, and Serial No. 786,468, filed Jan. 13, 1959 by H. W. Book, now abandoned, the insulation between the high voltage or primary conductors and the low voltage or secondary conductors has been utilized as the capacitor dielectric. In some cases this practice is undesirable because:

(1) It requires a metallic connection between the primary and the secondary circuits, which cannot be used with an ungrounded primary system and is not permitted in some localities regardless of grounding.

(2) To obtain the desired capacitive characteristics it may be desirable to use, in the capacitor, voltage stresses or dielectric materials which differ from those used between the primary and the secondary windings as described in copending applications, Serial No. 793,317, filed Feb. 16, 1959 and Serial No. 187,256, filed Apr. 13, 1962.

(3) To provide a variable capacitance, as described in a copending application (Case No. 31,764), now U.S. Patent No. 3,078,411, issued February 19, 1963, Serial No. 790,287, filed Jan. 30, 1959, two tap-changers are required to maintain a constant turn ratio between the primary and the secondary windings.

An object of this invention is to overcome the foregoing limitations in a transformer of the type described in the aforesaid copending applications.

Another object of the invention is to provide a transformer in which connections for the windings may be readily changed to obtain series capacitance, or shunt capacitance or no capacitance between the windings of the transformer.

A further object of the invention is to provide a transformer of a capacitance type which may be utilized with an ungrounded primary power system.

Still another object of the invention is to provide a transformer in which the capacitance between the windings may be readily varied.

Other objects of the invention will be explained fully hereinafter or will be apparent to those skilled in the art.

In accordance with one embodiment of the invention, a transformer having primary and secondary conductors is also provided with a third, or tertiary conductor, which constitutes one plate of a capacitor within the transformer. The tertiary conductor may be interleaved between the other two conductors or with only the primary conductor. Its length is that required to provide the desired capacitor plate area and its thickness is that needed to carry the capacitor current.

For a better understanding of the nature and objects of the invention, reference may be had to the following detailed description, taken in conjunction with the accompanying drawing, in which:

FIGURE 1 is a front elevational view, partly in section, of a transformer embodying features of the invention;

FIG. 2 is a view, in section, of a portion of a transformer having its windings arranged in a manner different from that shown in FIG. 1;

FIGS. 3, 4 and 5 are diagrammatic views showing different ways of connecting the transformer windings; and FIG. 6 is a chart showing the manner in which the switches in FIG. 5 may be operated to change the capacitance between the transformer windings.

Referring to the drawing, and particularly to FIG. 1, the transformer shown therein is generally of the type described in the aforesaid copending applications, Serial No 745,555 and Serial No. 786,468. As shown, the transformer comprises a core and coil assembly 10 including a first or primary winding P, a second or secondary winding S and a third or tertiary winding T which are disposed on a magnetic core structure 11. The magnetic core 11 includes two windows which are formed by first and second outer leg members 12 and 13, respectively, and a middle or winding leg member 14 on which the three windings P, S and T are disposed. The winding leg member 14 is enclosed or surrounded by a supporting member, specifically a tube or barrier 15, on which the three windings P, S and T are wound.

In particular, the first or primary winding comprises a plurality of turns of a first layer of conducting sheet material P and a second layer of insulating sheet material 21 which are generally spirally wound together about a portion of the magnetic core 11, specifically the winding leg member 14 in this particular case. Although the magnetic core 11 is illustrated as being of the shell form type, it is to be understood that the teachings of the invention may be incorporated in core and coil assemblies including magnetic cores of other types, such as those of the core form type. The width of the insulating sheet or film material 21 is preferably greater than the width of the layer of conducting sheet or foil material P in order to provide additional "creep" insulation between the adjacent turns of the first winding P. The tube or barrier 15 provides mechanical support for the first, second and third windings and may be formed from insulating material in certain applications to insulate said windings from the winding leg member 14 of the magnetic core 11. The conducting material P and the insulating material 21 are both of a general type in which the axial dimension of the material is relatively large compared to the radial dimension.

Similarly to the first winding, the second winding also includes a plurality of turns of a layer of conducting sheet material S and a layer of insulating sheet material 22. Like the first winding, and for the same reason, the width of a layer of insulating sheet material 22 of the second winding is preferably greater than the width of the layer of conducting sheet material S. In general, the turns of the second winding S are wound simultaneously with and continuously interleaved with at least a portion of the turns of the first winding P as shown in FIG. 1.

In particular, the turns of the first winding P and the second winding S are wound simultaneously in the portion of the overall core and coil assembly designated by A in FIG. 1. Each turn of the combined first and second windings includes one layer of insulating sheet material 21, one layer of conducting sheet material P, one layer of insulating sheet material 22 and one layer of conducting sheet material S. As described, the turns of the secondary winding are wound simultaneously with a portion of the turns of the primary winding and are continuously interleaved with the adjacent turns of the primary winding over the portion of the assembly designated by A.

After the combined turns of the primary winding and the secondary winding have been wound, as indicated at A, the final portion of the primary winding as indicated at B in FIG. 1, is wound with a plurality of turns of the third or tertiary winding T. A layer of insulating sheet material 23 is provided on each side of the conducting sheet material T, thereby providing a layer of insulating sheet material 23 between each turn of the primary winding P and the tertiary winding T. The insulating sheet material 23 is preferably composed of a material having a relatively high dielectric constant such as cyanoethyl cellulose, paper impregnated or coated with barium titanate, or other suitable material. The turns of the primary winding P and the tertiary winding T are wound simultaneously and are continuously interleaved in the portion of the assembly designated by B in FIG. 1 for a purpose which will be explained hereinafter.

In FIG. 2, the arrangement of the primary, the secondary and the tertiary windings is different from that in FIG. 1. Otherwise, the structure of the transformer is similar to that shown in FIG. 1. In FIG. 2, the tertiary conductor T is interleaved between the primary conductor P and the secondary conductor S through that portion of the windings over which the secondary conductor S extends as designated by A. Over the remaining portion of the winding designated by B, the tertiary conductor T is interleaved with the primary conductor P. Thus, the tertiary conductor T is interleaved with the primary conductor P throughout substantially the entire winding. A relatively high dielectric constant insulating sheet material 23 is disposed between each turn of the tertiary winding T and the primary winding P. Each turn of the primary winding P is separated from the adjacent turn of the secondary winding S by insulating sheet material 21 and each turn of the secondary winding S is separated from the adjacent turn of tertiary winding T by insulating sheet material 22 in a manner similar to that shown in FIG. 1. Thus, in both FIGS. 1 and 2 insulation which constitutes the capacitor dielectric is disposed between the tertiary winding T and the primary winding P. The insulation between the tertiary winding and the secondary winding is similar to that between the primary winding and the secondary winding and is determined by the specific application in a particular transformer.

The tertiary winding T is simultaneously wound with and interleaved with at least a portion of the primary winding P. As shown in FIGS. 3, 4 and 5, the tertiary winding is connected either to the winding which forms the other plate of the capacitor, or to a primary terminal which is not connected to the primary winding to provide a capacitor as described in the aforesaid copending applications.

The manner in which the primary winding and the tertiary winding are constructed or arranged with the adjacent turns of the respective windings being continuously interleaved has several results. Referring to FIG. 3, there is illustrated a diagrammatic view of the three windings of the transformer which are arranged in a manner similar to that shown in FIG. 1. Because of the insulating and conducting materials utilized and the manner in which the turns of the primary and the tertiary windings are interleaved, a predetermined capacitance results between the primary and tertiary windings. As illustrated, only one end of the primary winding P is connected to a terminal 26 suitable for connection to an external alternating current circuit or source. The other end of the primary winding P is not adapted for a physical electrical connection to an external circuit. Likewise, one end of the tertiary winding T is connected to a terminal 24 suitable for connection to the external power source. The secondary winding S is provided with terminals 28 and 30 suitable for connection to the load circuit. The inherent distributed capacitance between the adjacent turns of the primary and the tertiary windings is indicated at 32. It is important to note that any current flowing between the terminals 24 and 26 must flow through the capacitance 32. Therefore, the capacitance 32 has the effect of a capacitance connected in series with the primary winding P.

The capacitance 32 varies with several factors. For example, the capacitance 32 varies with the effective areas of the turns of the conducting material in the conductors P and T included in the primary and tertiary windings. The capacitance 32 also varies with the dielectric constant and the thickness of the layers of insulating material 23 included with the primary and the tertiary windings.

Since the current through the distributed capacitance 32 varies with or is dependent upon the current which flows to a load (not shown) connected across the secondary winding S at the terminals 28 and 30 when a potential is applied across the terminals 24 and 26, the effect of the distributed capacitance 32 between the adjacent turns of the primary and the tertiary windings may be considered as an effective single lumped capacitance which has the effect of a capacitance connected in series with the primary winding P. The effect of the capacitance 32 as a reactance also varies with the square of the potential of the voltage applied across the insulation between the primary and tertiary windings considered as a dielectric material. Because the adjacent turns of the primary and the tertiary windings are continuously interleaved, the potential difference or stress across the insulation or dielectric material between the adjacent turns of said windings is substantially uniform. Likewise, the voltage stress across the insulation between the adjacent turns of the primary and the secondary windings, which are continuously interleaved, is also substantially uniform. This results in more efficient utilization of the insulation as compared to a conventional transformer.

The manner in which a series capacitance provided in a transformer affects the magnitude of the load voltage is described in the aforesaid copending application, Serial No. 786,468. Briefly, the effect of the voltage across the capacitance which is effectively connected in series with the primary winding is to offset or cancel out at least a portion of the normally lagging power factor reactive voltage drop which occurs in the transformer and associated circuits. Thus, in a particular application, it may be desirable to provide a predetermined capacitance in a transformer such that the leading power factor reactance of said capacitance exceeds the normally lagging power factor reactance of a transformer core and coil assembly alone or in combination with that of an associated feeder line which connects the transformer core and coil assembly to a load.

In FIG. 4, the windings of the transformer are arranged in a manner similar to that shown in FIG. 2, where the turns of the tertiary winding T are interleaved with all of the turns of the primary winding P. The turns of the secondary winding S are interleaved with only a portion of the turns of the primary winding P. Provision is made for varying the voltage applied to the capacitance between the tertiary winding T and the primary winding P by means of a tap changer 34 which may be utilized to connect the tertiary winding T to different taps on the primary winding P. In this manner, the voltage developed between the tertiary winding T and the primary winding P, and consequently the effect of the capacitance between these windings, may be changed to suit different operating conditions. Since both terminals of the primary winding P are connected directly to a power source and both terminals of the secondary winding S are connected directly to the load, the capacitance in this case has the effect of a capacitance connected in shunt or parallel with the primary winding P. The capacitance does not vary with the load current. However, as explained previously, the effective voltage applied to the capacitance can be changed by means of the tap changer 34. The taps may be provided on either the primary winding or on the tertiary winding.

The manner in which a shunt capacitance affects the operation of a transformer is fully described in the aforesaid copending application, Serial No. 745,555. Briefly, the leading power factor current drawn by the capacitance between the primary winding and the tertiary winding and the magnetizing component of the exciting current of the transformer are substantially 180° out of phase. Thus, the transformer may be so constructed that the leading power factor current substantially cancels the magnetizing component of the exciting current or the capacitance provided may be such as to draw a leading power factor current which is even larger than the magnetizing component of the exciting current. This means that even when the transformer is not connected to a load across the secondary winding S the transformer may be constructed to draw a leading power factor no-load current. In the latter case, the leading power factor no-load current drawn by a transformer, such as disclosed, will offset the lagging power factor current being drawn elsewhere in a distribution system to thereby increase the overall efficiency of the distribution system.

In the arrangement shown in FIG. 5, the tertiary winding T may be utilized to provide either series or shunt capacitance. As indicated by the table in FIG. 6, when the switch 1 is open and the switch 2 is closed, the connections are similar to those shown in FIG. 3 and the capacitance between the tertiary and the primary winding has the effect of a series capacitance. When the switches 1 and 2 are both closed, the tertiary winding T is connected to one terminal of the primary winding P and the capacitance between these windings has the effect of a shunt capacitance. When the switch 2 is open and the switch 1 is closed, the tertiary winding T is not connected to either one of the other windings and there is no effective capacitance between the tertiary winding and the other windings.

It is to be understood that other forms of electrical inductive apparatus utilizing the teachings of the present invention may be provided with different arrangements of the insulation between the turns of the respective windings. For example, instead of utilizing separate layers of sheet or film insulation between the turns of the primary winding and the secondary winding the layers of conducting sheet material may be coated with an insulating material, such as enamel.

It is also to be understood that in higher ratings of transformers where the use of relatively massive conducting material is objectionable because of mechanical difficulty in winding turns of such material or because of excessive eddy current losses, two or more winding groups may be wound in accordance with the teachings of this invention and assembled on a common core. As an alternative arrangement, the single layers of conducting material may be replaced with a plurality of layers of conducting material disposed adjacent to each other in a radial direction and wound into a single winding group.

Other winding arrangements, well known in the art, may be utilized, if desired. For example, the tertiary conductor may be introduced at any stage in the winding process. It may or may not be of the same length as the primary or the secondary, may or may not be interposed between them, and may or may not be started simultaneously with either of the other conductors.

From the foregoing description it is apparent that the utilization of the tertiary conductor as disclosed removes the restrictions cited at the beginning of this specification and provides flexibility in the utilization of the transformer windings. Furthermore, no metallic connection between the primary winding and the secondary circuit is required. The capacitor dielectric is separated from the insulation between the primary and the secondary windings. Variable capacitance may be provided with a single tap changer. The effective plate area of the capacitor is not restricted to that provided by the secondary conductor, but may be changed by changing the number of turns in the tertiary winding.

Electrical apparatus constructed in accordance with the present invention has several advantages. By connecting the windings to obtain a shunt capacitance, the advantages of the construction disclosed in the aforesaid copending application, Serial No. 745,555 are obtained. Thus, a reduction in the exciting current of a transformer may be obtained.

When the winding connections are such as to provide a series capacitance, the advantages set forth in copending application, Serial No. 786,468 are obtained. In this case, a leading power factor compensation is obtained which varies with the load current being carried by the transformer. This feature is effective to improve the voltage regulation of an electrical distribution system on a continuous basis, rather than in steps as with a conventional tap changing transformer.

Since numerous changes may be made in the above described construction and different embodiments of the invention may be made without departing from the spirit and scope thereof, it is intended that all the matter contained in the foregoing description or shown in the accompanying drawing shall be interpreted as illustrative and not in a limiting sense.

I claim as my invention.

1. A transformer comprising a primary winding having a plurality of turns, a secondary winding having a plurality of turns, a tertiary winding having a plurality of turns, the turns of the tertiary winding being continuously interleaved with at least part of the turns of the primary winding, electrical insulating means disposed between the turns of the primary and the tertiary windings to provide a predetermined capacitance between said primary and tertiary windings, and means electrically connecting a point on said primary winding with a point on said tertiary winding to effectively connect said predetermined capacitance in shunt with said primary winding, said transformer being capable of transforming voltage dependent upon the ratio of turns in said primary and secondary windings.

2. In a transformer, in combination, a magnetic core, a primary winding having a plurality of turns spirally wound about a portion of said core, a secondary winding having a plurality of turns disposed adjacent to part of the turns of the primary winding, a tertiary winding having a plurality of turns disposed adjacent to and continuously interleaved with at least part of the turns of the primary winding, first insulating means disposed between the turns of said primary and tertiary windings to provide a predetermined capacitance between said primary and tertiary windings, and means electrically interconnecting turns intermediate the ends of said primary and tertiary windings to maintain a potential difference across the predetermined capacitance between said windings when the primary winding is connected to an alternating potential, said predetermined capacitance being effectively connected in shunt with said primary winding, said transformer being capable of transforming voltage dependent upon the ratio of turns in said primary and secondary windings.

3. In a transformer for connecting to an alternating current source, in combination, a magnetic core, a primary winding having a plurality of turns spirally wound about a portion of said core, a secondary winding for connecting to a load circuit, said secondary winding having a plurality of turns disposed adjacent to part of the turns of the primary winding, a tertiary winding having a plurality of turns disposed adjacent to and continuously interleaved with at least part of the turns of the primary winding, and tap-changing means interconnecting the primary and the tertiary windings to provide a variable shunt capacitance between said windings when the primary winding is connected to the alternating current source, said transformer being capable of transforming voltage dependent upon the ratio of turns in said primary and secondary windings.

4. In a transformer for connecting to an alternating current source, in combination, a magnetic core, a primary winding having a plurality of turns spirally wound about a portion of said core, a secondary winding for connecting to a load circuit, said secondary winding having a plurality of turns disposed adjacent to and interleaved with part of the turns of the primary winding, a tertiary winding having a plurality of turns disposed adjacent to and continuously interleaved with at least part of the turns of the primary winding, and switching means interconnecting the primary and the tertiary windings to provide a capacitance between said primary and tertiary windings when the primary winding is connected to the alternating current source, said transformer being capable of transforming voltage dependent upon the ratio of turns in said primary and secondary windings.

References Cited by the Examiner

UNITED STATES PATENTS

| | | | |
|---|---|---|---|
| 1,214,555 | 2/17 | Leece | 336—147 X |
| 1,362,492 | 12/20 | Kierstead | 336—147 |
| 2,521,513 | 9/50 | Gray | 336—165 X |
| 3,078,411 | 2/63 | Book | 336—69 X |

FOREIGN PATENTS

| | | |
|---|---|---|
| 1,261,940 | 4/61 | France. |
| 872,073 | 7/61 | Great Britain. |

JOHN F. BURNS, *Primary Examiner.*

E. JAMES SAX, *Examiner.*